(12) United States Patent
Hong

(10) Patent No.: US 8,686,690 B2
(45) Date of Patent: Apr. 1, 2014

(54) METHOD OF CHARGING BATTERY PACK AND BATTERY PACK

(75) Inventor: Seongpyo Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 332 days.

(21) Appl. No.: 12/868,655

(22) Filed: Aug. 25, 2010

(65) Prior Publication Data

US 2011/0057621 A1    Mar. 10, 2011

(30) Foreign Application Priority Data

Sep. 8, 2009  (KR) ........................ 10-2009-0084430

(51) Int. Cl.
*H02J 7/00*    (2006.01)

(52) U.S. Cl.
USPC .......................................... 320/134; 320/125

(58) Field of Classification Search
USPC ......................................................... 320/134
See application file for complete search history.

(56) References Cited

U.S. PATENT DOCUMENTS

| | | | | |
|---|---|---|---|---|
| 5,508,598 | A * | 4/1996 | Al-Abassy | 320/129 |
| 2002/0000788 | A1 * | 1/2002 | Ostergaard et al. | 320/128 |
| 2005/0077878 | A1 * | 4/2005 | Carrier et al. | 320/134 |
| 2008/0084185 | A1 * | 4/2008 | Nakazawa | 320/128 |

FOREIGN PATENT DOCUMENTS

| | | |
|---|---|---|
| JP | 10-174283 | 6/1998 |
| JP | 10-223261 | 8/1998 |
| JP | 2001-245438 | 9/2001 |
| KR | 1994-0001511 | 1/1994 |
| KR | 1994-7001598 | 5/1994 |
| KR | 10-2000-0019006 | 4/2000 |
| KR | 10-2000-0019006 A | 4/2000 |
| KR | 10-2005-0041083 A | 5/2005 |
| WO | WO 92/22120 | 12/1992 |

OTHER PUBLICATIONS

Japanese Office Action dated Aug. 21, 2012 of the corresponding Japanese Patent Application No. 2010-154614.
Patent Abstracts of Japan and English Machine Translation of Japanese Publication No. 2001-245438.
Korean Notice of Allowance for KR 10-2009-0084430 dated Apr. 20, 2011 (5 pages).
English Translation for KR 1994-0001511 to follow.
Machine English Translation of JP 10-223261.
Machine English Translation of JP 10-174283.

* cited by examiner

*Primary Examiner* — Arun Williams
(74) *Attorney, Agent, or Firm* — Christie, Parker & Hale, LLP

(57) ABSTRACT

A method of charging a battery pack that can prevent a battery or an external power source from being damaged due to a trickle charge current in order to improve battery safety, and the battery itself. The method of charging the battery pack includes determining whether a charge current exists, determining whether the charge current and a charge voltage are changed if determined that the charge current exists, determining whether the charge current is changed from a first current level to a second current level less than the first current level, and a present voltage level of the battery is less than a former voltage level if determined that the charge current and the charge voltage are changed, and maintaining the charge current at the second current level for a predetermined maintenance time if determined that the present voltage level of the battery is less than the former voltage level.

19 Claims, 3 Drawing Sheets

METHOD OF CHARGING BATTERY PACK AND BATTERY PACK

CROSS-REFERENCE TO RELATED APPLICATIONS

This application claims the benefit of Korean Patent Application No. 10-2009-0084430, filed Sep. 8, 2009, in the Korean Intellectual Property Office, the disclosure of which is incorporated herein by reference.

BACKGROUND

1. Field

Aspects of the present invention relate to a method of charging a battery pack and the battery pack.

2. Description of the Related Art

As portable electrical devices such as cellular phones, notebook computers, camcorders, personal digital assistants (PDAs), and other similar portable electrical devices are being developed, secondary batteries are being actively researched.

Such a secondary battery is configured as a battery pack including a battery cell and a charge/discharge circuit. The battery cell is charged or discharged by an external power source or load through an external terminal installed in the battery pack. That is, when the external power source is connected to the battery pack through the external terminal, the battery cell is charged by an external power supplied through the external terminal and the charge/discharge circuit. When the external load is connected to the battery pack through the external terminal, a power of the battery cell is supplied to the external load through the charge/discharge circuit and the external terminal to discharge the battery cell. Here, the charge/discharge circuit is disposed between the external terminal and the battery cell to control a charging/discharging operation of the battery cell.

Generally, in the charging operation of the battery cell, the battery cell is charged at maximal charging current until a power of the battery cell reaches a certain voltage. Then, when the power of the battery cell reaches the certain voltage, the charge current gradually decreases.

However, a case exists wherein the voltage of the battery cell and the charge current decrease at once and subsequently the charge current again increases, i.e., a trickle charge current occurs repeatedly during the charging operation of the battery cell. In such a case, the trickle charge current damages the battery cell or the external power source to and deteriorates safety of the battery cell and/or the external power source.

SUMMARY

Aspects of the present invention provide a method of charging a battery pack preventing a battery and/or an external power source from being damaged due to a trickle charge current in order to improve the safety of the battery, and to improve the battery itself.

Aspects of the present invention provide a method of charging a battery pack, the method including: determining whether a charge current exists; determining whether the charge current and a charge voltage are changed if determined that the charge current exists; determining whether the charge current is changed from a first current level to a second current level less than the first current level, and a present voltage level of the battery is less than a former voltage level if determined that the charge current and the charge voltage are changed; and maintaining the charge current at the second current level for a predetermined maintenance time if determined that the present voltage level of the battery is less than the former voltage level.

According to an aspect of the present invention, the determining of whether the charge current exists may include determining that the charge current exists if the charge current is detected for a predetermined detection time. The predetermined detection time may range from about 0.5 seconds to about 2 seconds.

According to an aspect of the present invention, the determining of whether the charge current exists may include recognizing that the battery is in a self discharge mode if the charge current does not exist.

According to an aspect of the present invention, the predetermined maintenance time may range from about 0.5 seconds to about 2 seconds.

According to an aspect of the present invention, the determining of whether the charge current and the charge voltage are changed may include determining that the charge current and the charge voltage are changed if a charge control signal changing both the charge current and the charge voltage is received from an external system controlling the charging of the battery.

According to an aspect of the present invention, the maintaining of the charge current at the second current level for the predetermined maintenance time may include generating a changed charge current maintenance signal maintaining the charge current at the second current level for the predetermined maintenance time and transmitting the changed charge current maintenance signal to an external system controlling the charging of the battery.

According to an aspect of the present invention, the battery may be charged according to a charging operation type in which the charge current is reduced sequentially if the charge voltage is increased by an external system.

According to an aspect of the present invention, the charge current may be reduced in tiers.

Another aspect of the present invention provides a battery pack including: a battery including at least one battery cell, the battery being connected to an external terminal through a high current path; a protective circuit connected in parallel to the battery and the external terminal, the protective circuit detecting a voltage of the battery; and a controller connected in series between the protective circuit and the external terminal in order to receive a voltage level of the battery from the protective circuit, the controller communicating with an external system through the external terminal, wherein if the controller determines that a charge current exists in the battery, and if the controller determines that the charge current and a charge voltage are changed, and if the controller determines that the charge current of the battery is changed from a first current level to a second current level less than the first current level, and if the controller determines that the present voltage level is less than the former voltage level, then the controller generates a changed charge current maintenance signal maintaining the charge current at the second current level for a predetermined maintenance time.

According to an aspect of the present invention, the battery pack may further include a sensor resistor disposed on the high current path, the sensor resistor being connected to the controller, wherein the controller determines that the charge current exists in the battery if the charge current of the battery is detected in the sensor resistor for a predetermined detection time.

According to an aspect of the present invention, the predetermined detection time may range from about 0.5 seconds to about 2 seconds.

According to an aspect of the present invention, if the charge current does not exist in the battery, the controller may recognize that that the battery is in a self discharge mode, generate a self discharge mode signal, and transmits the self discharge mode signal to the external system.

According to an aspect of the present invention, the predetermined maintenance time may range from about 0.5 seconds to about 2 seconds.

According to an aspect of the present invention, the controller determines that the charge current and the charge voltage are changed if a charge control signal changing the charge current and the charge voltage is received from the external system controlling the charging of the battery.

According to an aspect of the present invention, the controller may transmit the changed charge current maintenance signal to the external system controlling the charging of the battery.

According to an aspect of the present invention, the battery pack may further include an SMBUS between the controller and the external terminal, the SMBUS allowing the controller and the external system to communicate with each other.

According to an aspect of the present invention, the battery may be charged according to a charging operation type wherein the charge current is reduced sequentially if the charge voltage is increased by the external system.

According to an aspect of the present invention, the charge current may be reduced in tiers.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
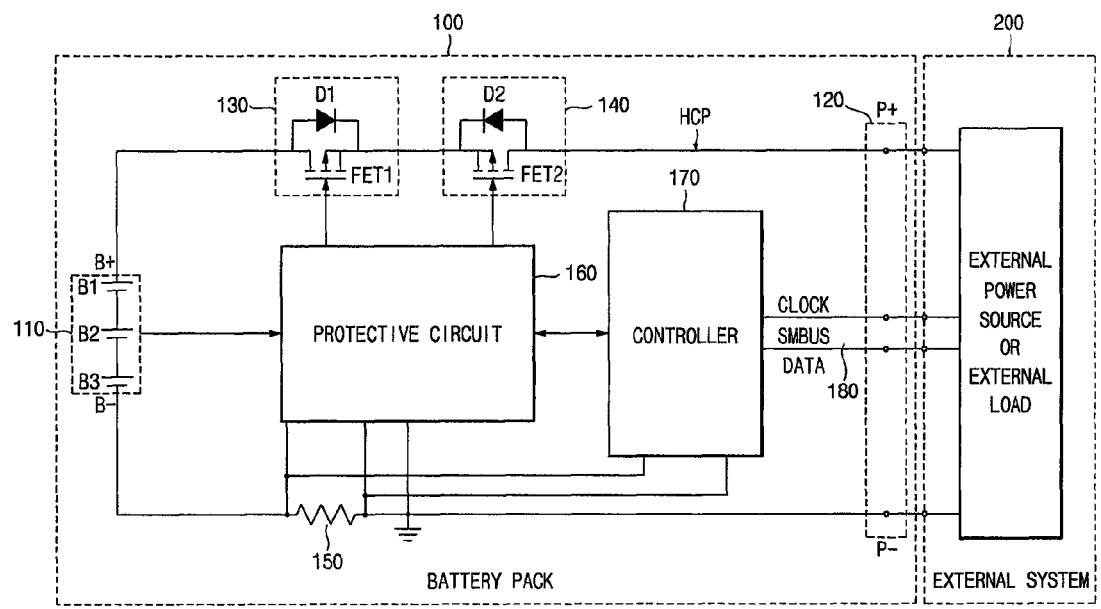
FIG. 1 illustrates a circuit diagram of a battery pack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, when a certain element is "connected" to another element, the elements may be "directly connected" to each other or "electrically connected" to each other with another device being interposed therebetween.

Figure 2:
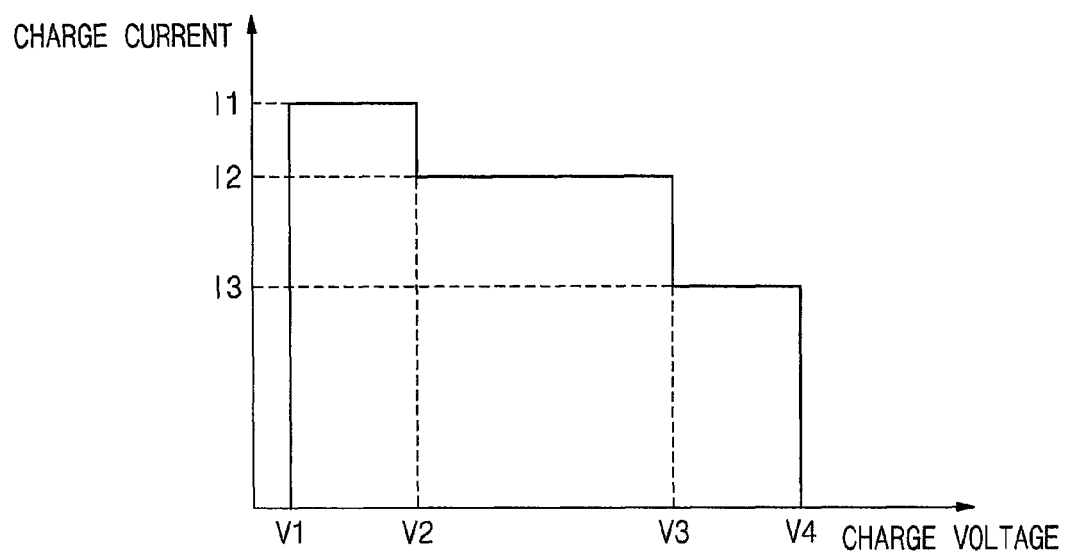
FIG. 2 illustrates a graph of a charging manner of an external power source for charging a battery pack according to an embodiment of the present invention.

FIG. 1 illustrates a circuit diagram of a configuration of a battery pack according to an embodiment of the present invention, and FIG. 2 illustrates a graph of a charging manner of an external power source for charging a battery pack.

Referring to FIGS. 1 and 2, a battery pack 100 includes a battery 110, an external terminal 120, a charge device 130, a discharge device 140, a sensor resistor 150, a protective circuit 160, a controller 170, and an SMBUS 180.

The battery pack 100 is connected to an external power source or an external load of an external system 200 through the external terminal 120 to perform a charging operation or a discharging operation. A high current path (HCP) between the external terminal 120 and the battery 110 is used as a charge/discharge path. A relatively large current flows through the high current path HCP. The battery pack 100 may communicate with the external system 200 through the SMBUS 180.

The external system 200 may include an external power source such as an adapter (not shown) for supplying a power into portable electrical devices, e.g., portable notebook computers or other similar portable electrical devices. The battery 110 may be charged by the external power source of the external system 200. When the external system 200 is separated from the external power source, a power of the battery 110 is supplied to the external load of the external system 200 through the external terminal 120 to discharge the battery 110.

A configuration of the battery pack 100 according to an embodiment will be described in detail. The battery 110 may include at least one of battery cells B1, B2, and B3. The battery 110 may be charged or discharged at a constant voltage. In drawings, reference symbols B+ and B− indicate high current ends and represent a positive power source and a negative power source of the battery cells B1, B2, and B3 connected to each other in series, respectively. Although three battery cells B1, B2, B3 are connected to each other in series to form the battery 110, aspects of the present invention are not limited thereto and the number of battery cells may be varied according to a capacity need for the external system.

The external terminal 120 is connected in parallel to the battery 110. Also, the external terminal 120 is connected to the external power source or the external load to charge or discharge the battery the battery 110. In drawings, reference symbol P+ represents a positive terminal connected to the positive power source B+ of the battery 110, and reference symbol P− represents a negative terminal connected to the negative power source B− of the battery 110. The battery pack 100 is connected to the external power source or the external load of the external system 200 through the external terminal 120. That is, when the external system 200 connected to the external power source is connected to the external terminal 120, the battery 110 is charged by the external power source. Also, when the external load of the external system 200 is connected to the external terminal 120, the battery 110 is discharged by the external load.

The charge device 130 and the discharge device 140 are connected to each other in series on the high current path HCP between the battery 110 and the external terminal 120 to perform the charging or discharging operation. Each of the charge device 130 and the discharge device 140 includes a field effect transistor (FET) and a parasitic diode (D). That is, the charge device 130 includes the FET1 and D1, and the discharge device 140 includes FET2 and D2. A connection direction between a source and a drain of the FET1 of the charge device 130 is opposite to that of the FET2 of the discharge device 140. As a result, the FET1 of the charge device 130 restricts a current flow from the external terminal 120 to the battery 110, and the FET2 of the discharge device 140 restricts a current flow from the battery 110 to the external terminal 120. Here, the FET1 and FET2 of the charge and discharge devices 130 and 140 may include switching devices, respectively, however, aspects of the present invention are not limited thereto. For example, other types of electrical devices performing a switching function may be used. Also, the D1 and D2 of the charge and discharge devices 130 and 140 are configured to allow a current to flow in a direction opposite to that in which the current flow is restricted.

The sensor resistor 150 is connected in series on the high current path HCP between the battery 110 and the external terminal 120. Both ends of the sensor resistor 150 are connected to the protective circuit 160 or the controller 170. As a result, the sensor resistor 150 allows the protective circuit 160 or the controller 170 to confirm voltage values of both ends of the sensor resistor 150 and a resistance value of the sensor resistor 150. Thus, the sensor resistor 150 transmits data with respect to a charge current or a discharge current of the battery 110 to the protective circuit 160 or the controller 170.

The protective circuit 160 is connected in parallel between the battery 110 and the charge and discharge devices 130 and 140. The protective circuit 160 is connected in series between the battery 110 and the controller 170. The protective circuit 160 detects a voltage of the battery 110 to transmit the detected voltage to the controller 170. The protective circuit 160 operates the charge device 130 and the discharge device 140 under the control of the controller 170. Here, the protective circuit 160 may be realized by a protective circuit IC (integrated circuit) or an analog front end (AFE) IC, however, aspects of the present invention are not limited thereto and other similar circuits may be used.

For example, if the external system 200 is connected to the battery 110, then the protective circuit 160 sets the FET1 of the charge device 130 to be in an ON state and sets the FET2 of the discharge device 140 to be in an ON state in order to charge the battery 110. Similarly, when the external load of the external system 200 is connected to the battery 110, the protective circuit 160 sets the FET1 of the charge device 130 to be in an ON state and the FET2 of the discharge device 140 to be in an ON state under the control of the controller 170 in order to discharge the battery 110. Although not shown, the protective circuit 160 may detect voltages of each of the battery cells B1, B2, and B3.

The controller 170 includes an integrated circuit (IC) connected in series between the protective circuit 160 and the external terminal 120. The controller 170 stores a voltage level of the battery 110 received through the protective circuit 160 in order to compare the stored voltage level to a preset voltage level. In addition, the controller 170 outputs a control signal according to the comparison result in order to turn ON/OFF the charge device 130 and the discharge device 140.

For example, if a voltage level of the battery 110 received by the controller 170 is greater than a preset overcharge voltage level, e.g., about 4.35 V, the controller 170 determines that the battery 110 is in an overcharge state and outputs a control signal corresponding to the overcharge state, thereby turning off the FET1 of the charge device 130. Thus, the charging operation charging the battery 110 from the external power source of the external system 200 is interrupted. At this time, the D1 of the charge device 130 allows the battery pack to be discharged even if the FET 1 of the charge device 130 is turned off. On the other hand, if a voltage level of the battery 110 received by the controller 170 is less than a preset overdischarge voltage level, e.g., about 2.30 V, the controller 170 determines that the battery 110 is in an overdischarge state and outputs a control signal corresponding to the overdischarge state, thereby turning off the FET2 of the discharge device 140. Thus, the discharging operation discharging the battery 110 with the external load of the external system 200 is interrupted. At this time, the D2 of the discharge device 140 allows the battery pack to be charged even if the FET 2 of the discharge device 140 is turned off.

The controller 170 communicates with the external system 200 through the SMBUS 180 with respect to the charging/discharging operation. That is, the controller 170 receives data, such as a voltage level of the battery 110, through the protective circuit 160 in order to transmit the received data to the external system 200. Thus, the controller 170 allows the external power source of the external system 200 to confirm the data such as the voltage level of the battery 110 in order to control the charging operation of the battery 110. In the embodiment illustrated in FIGS. 1 and 2, the external power source of the external system 200 controls the charging operation of the battery 110 to be a multi-step current charging operation type, wherein a charge current is reduced sequentially, e.g., in tiers according to a charge voltage increasing, as shown in FIG. 2.

For example, if the external power source of the external system 200 confirms that the voltage level of the battery 110 received from the controller 170 is less than a charge voltage V1, the external power source of the external system 200 controls the battery 110 to charge the battery 110 at a charge current I1 if the charge voltage is in the range of V1 to V2. Thus, the voltage of the battery 110 may increase up to the charge voltage V2. If the external power source of the external system 200 confirms that the voltage level of the battery 110 received from the controller 170 increases up to the charge voltage V2, the external power source of the external system 200 controls the battery 110 to charge the battery 110 at a charge current I2 if the charge voltage is in the range of V2 to V3. Thus, the voltage of the battery 110 may increase up to the charge voltage V3. If the external power source of the external system 200 confirms that the voltage level of the battery 110 received from the controller 170 increases up to the charge voltage V3, the external power source of the external system 200 controls the battery 110 to charge the battery 110 at a charge current I3 if the charge voltage is in the range of V3 to V4. Thus, the voltage of the battery 110 may increase up to the charge voltage V4. Here, the charge voltage V4 may be a maximum charge voltage limiting the charging operation of the battery 110.

In the multi-step current charging operation type, if the controller 170 confirms that the charge current of the battery 110 is changed from a first current level to a second current level less than the first current level, and the present current of the battery 110 is less than the former current at a point in time at which the charge current exists and the charge current and the charge voltage are both changed, then the controller 170 generates a changed charge current maintenance signal. The changed charge current maintenance signal maintains the charge current of the battery 110 at the second current level for a predetermined maintenance time in order to prevent the charge current of the battery 110 from again increasing to the first current level. Also, the controller 170 transmits the changed charge current maintenance signal to the external power source of the external system 200. Thus, the external power source of the external system 200 controls the charging operation of the battery 110 in order to maintain the charge current of the battery 110 at the second current level for the predetermined maintenance time.

As a result, even under the conditions noted above, wherein the charge current of the battery cell increases again to the first current level, or in other words, a state wherein a trickle charge current occurs, the trickle charge current is prevented. The predetermined maintenance time ranges from about 0.5 seconds to about 2 seconds. If the predetermined maintenance time is less than about 0.5 seconds, a charge time of the battery 110 is too short. Also, if the predetermined maintenance time is greater than about 2 seconds, a charge time of the battery 110 is too long.

When the charge current of the battery 110 is changed from the first current level to the second current level less than the first current level and the present current of the battery 110 is less than the former current at a point in time at which the charge current exists and the charge current and the charge voltage are both changed, the trickle charge current may occur.

The controller 170 determines a condition wherein the charge current exists in the battery 110, or in other words, the controller 170 determines if the battery 110 is being charged. The controller 170 determines that the charge current exists if the charge current flowing through the sensor resistor 150 is detected for a predetermined detection time. On the other hand, when the charge current flowing through the sensor resistor 150 is not detected for the predetermined detection time, the controller 170 determines that the battery 110 is in a self discharge mode and generates a self discharge mode signal to transmit the self discharge mode signal to the external system 200. Here, the predetermined detection time ranges from about 0.5 seconds to about 2 seconds. This is done because the controller 170 may misjudge the charge current of the battery 110 as a noise or an electrostatic discharge (ESD) when the predetermined detection time is less than about 0.5 seconds. Also, when the predetermined detection time is greater than about 2 seconds, the charge current detection time may be wasted.

If the controller 170 determines that the charge current exists in the battery 110, the controller 170 also determines whether the charge current and the charge voltage are both changed. For example, if the controller 170 receives a charge control signal changing the charge voltage from V1 to V2, and the charge current is changed from I1 to I2, the controller 170 determines that the charge current and the charge voltage are both changed. Then, if the controller 170 confirms that the charge current is changed from the first current level (e.g., I1) to the second current level (e.g., I2) less than the first current level, and a present voltage level of the battery 110 is less than the former voltage level, the controller 170 determines that the trickle charge current occurs.

As described above, the controller 170 determines a condition wherein the trickle charge current occurs and controls the charging operation of the battery 110, thereby preventing the trickle charge current from occurring during the charging of the battery 110.

The SMBUS 180 is disposed between the controller 170 and the external terminal 120 so that the controller 170 and the external system 200 communicate with each other. The SMBUS 180 includes a clock terminal CLOCK and a data terminal DATA.

As described above, the battery pack 100, according to an embodiment of the present invention, includes the controller 170 controlling the charging operation of the battery 110 in order to maintain the charging of the battery 110 at the second current level for a predetermined maintenance time. Thus, the charge current is prevented from again increasing to the first current level when the charge current is changed from the first current level to the second current level less than the first current level, and the present voltage level of the battery 110 is less than the former voltage level at the point in time at which the charge current and the charge voltage are both changed during the charging of the battery 110. Therefore, the trickle charge current is prevented from occurring.

Furthermore, the battery pack 100, according to aspects of the present invention, prevents the battery 110 and/or the external power source from being damaged by the trickle charge current and improves the safety of the battery 110.

Figure 3:
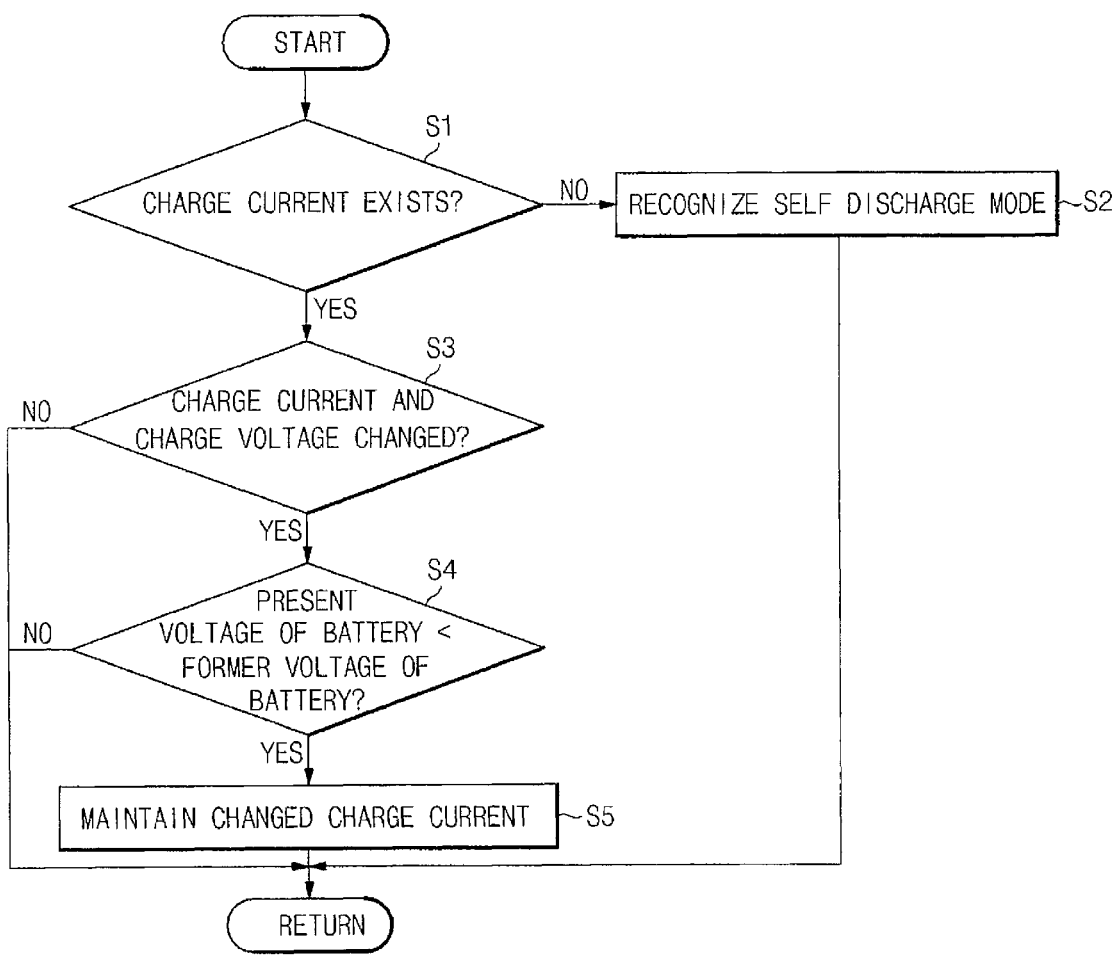
FIG. 3 illustrates a flowchart of a charging method of the battery pack of FIG. 1.

A method of charging the battery pack 100 of FIG. 1 according to an embodiment will now be described in detail. FIG. 3 illustrates a flowchart of a charging method of the battery pack of FIG. 1.

Referring to FIG. 3, a method of charging the battery pack 100 includes operation S1 to determine whether a charge current exists, operation S2 to recognize a self discharge mode, operation S3 to determine a change in a charge current and charge voltage, operation S4 to determine a battery voltage reduction, and operation S5 to maintain a changed charge current. Here, it is assumed that the battery 110 is charged according to the multi-step current charging operation type in which the charge current is reduced sequentially according to the charge voltage increasing.

In operation S1, the controller 170 determines whether the charge current exists in the battery 110, or in other words, whether the battery 110 is being charged. The controller 170 detects the voltages at both ends of the sensor resistor 150 in order to detect the charge current. If the charge current is detected for the predetermined detection time, the controller 170 determines that the charge current exists. The predetermined detection time ranges from about 0.5 seconds to about 2 seconds, however aspects of the present invention are not limited thereto and the predetermined detection time may vary.

If the controller 170 determines that the charge current does not exist in the battery 110, or in other words, the controller 170 does not detect the voltages at both ends of the sensor resistor 150 or the controller 170 detect the voltages of both ends of the sensor resistor 150 for a time less than the predetermined detection time in operation S1, the controller 170 recognizes that the battery 110 is in a self discharge mode. The controller 170 then generates a self discharge mode signal and transmits the self discharge mode signal to the external power source of the external system 200 in operation S2.

If the controller 170 determines that the charge current exists in the battery 110 in operation S1, the controller 170 determines whether the charge current and the charge voltage are changed in operation S3. When the charge current supplied from the external power source of the external system 200 is changed, and the charge control signal changing the charge voltage is received, the controller 170 determines that the charge current and the charge voltage are both changed.

When the controller 170 determines that the charge current and the charge voltage are both changed in operation S3, the controller 170 determines whether the charge current is changed from the first current level to the second current level less than the first current level, and determines whether the present voltage level of the battery 110 is less than the former voltage level in operation S4. By detecting the charge current through the sensor resistor 150, the change in the charge current of the battery 110 from the first current level to the second current level is confirmed. Also, by comparing the present voltage level of the battery to the former voltage level of the battery, it can be determined whether the present voltage level of the battery 110 is less than the former voltage level.

If the controller 170 determines that the charge current of the battery 110 is changed from the first current level to the second current level less than the first current level, and if the controller 170 determines that the present voltage level of the battery 110 is less than the former voltage level in operation S4, the controller 170 generates the changed charge current maintenance signal. The changed charge current maintenance signal is transmitted to the external power source of the external system 200 in order to maintain the charge current of the battery 110 at the second current level for the predetermined maintenance time in operation S5. Then, the external power source of the external system 200 controls the charging operation of the battery 110 in order to maintain the charge current of the battery 110 at the second current level for the predetermined maintenance time. The predetermined maintenance time ranges from about 0.5 seconds to about 2 seconds, however, aspects of the present invention are not limited thereto and the predetermined maintenance time may vary.

Figure 4A:
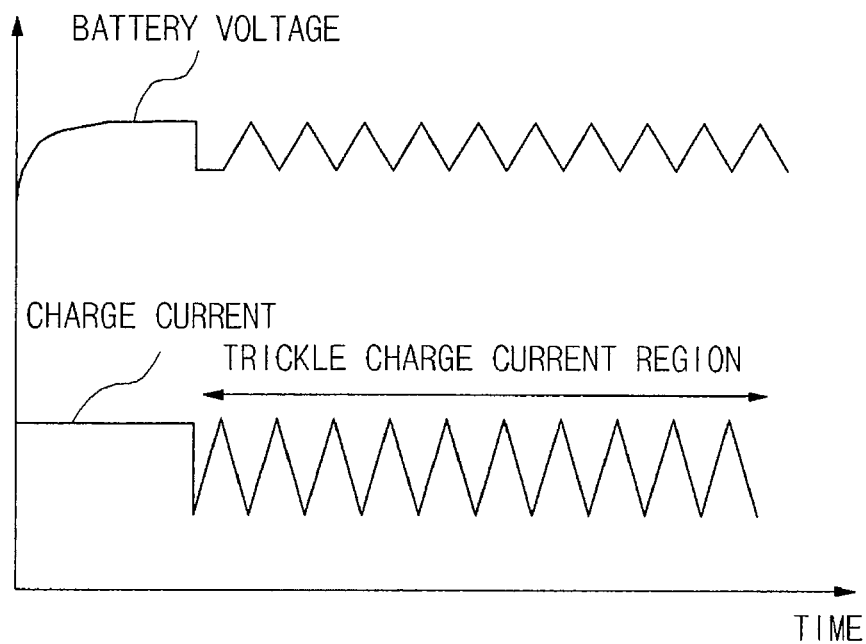
FIG. 4A illustrates a graph of a state in which a trickle charge current occurs in case where the charging method of the battery pack of FIG. 3 is not applied.
Figure 4B:
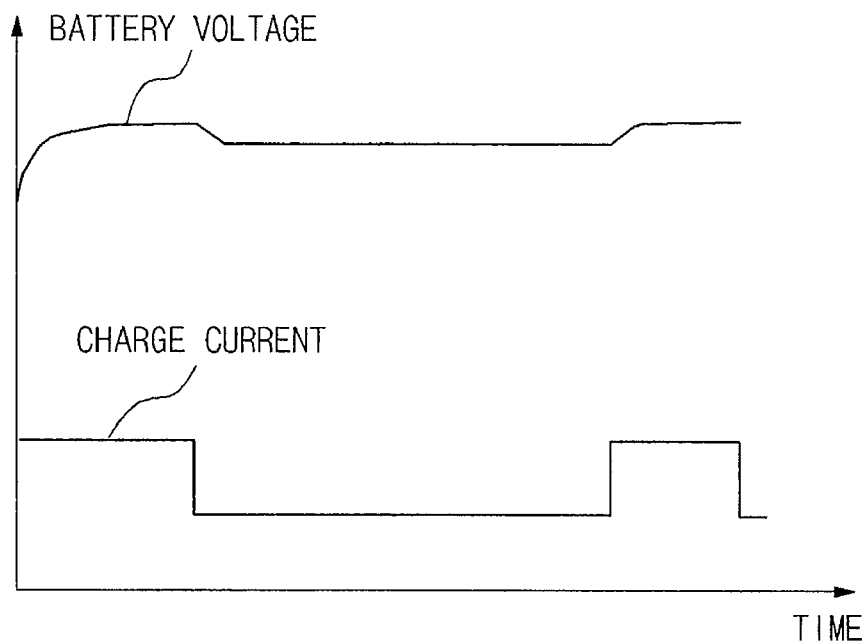
FIG. 4B illustrates a graph of a state in which the trickle charge current does not occur in case where the charging method of the battery pack of FIG. 3 is applied.

Cases in which the trickle charge current does or does not exist will be described with reference to FIGS. 4A and 4B. FIG. 4A illustrates a graph of a state wherein a trickle charge current occurs and the a multi-step current charging method of the battery pack of FIG. 3 is not applied, and FIG. 4B illustrates a graph of a state wherein the trickle charge current does not occur and the multi-step charging method of the battery pack of FIG. 3 is applied. Horizontal axes of FIGS. 4A and 4B represent a time, and vertical axes of FIGS. 4A and 4B represent a battery voltage and a charge current.

Referring to FIG. 4A, when the charging method of the battery pack of FIG. 3 is not applied, the battery is charged at a certain charge current until the battery voltage reaches a certain voltage. Then, after the battery voltage reaches the certain voltage, as the charge current decreases, the battery voltage decreases. Thereafter, the charge current increases again. That is, the trickle charge current occurs repeatedly. In this case, the battery or the external power source is damaged and safety of the battery decreases.

On the other hand, referring to FIG. 4B, the multi-step current charging method is applied and the charge current is maintained for the predetermined maintenance time if the charge current decreases. Thus, even if the battery is charged at the certain charge current until the battery voltage reaches a certain voltage, and then, as the charge current decreases and the battery voltage decreases, the charge current is maintained for the predetermined maintenance time so that the charge current decreases. Thus, the charge current is prevented from increasing again, or in other words, the trickle charge current is prevented from occurring repeatedly. In this case, damage to the battery and/or the external power source is prevented, and safety is improved.

In the method of charging the battery pack, according to aspects of the present invention, if the charge current of the battery decreases to decrease the battery voltage at the point in time at which the charge current and the charge voltage are both changed during the charging of the battery, the charging operation of the battery may be controlled such that the charge current of the battery is maintained at the decreased current level. Thus, the charge current is prevented from increasing again. Or in other words, the trickle charge current is prevented from occurring repeatedly if the charge current of the battery decreases in order to decrease the battery voltage. Furthermore, the method of charging the battery pack prevents the battery and the external power source from being damaged due to the trickle charge current, and thus, safety is improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of charging a battery pack, the method comprising:
  determining whether a charge current exists;
  determining whether the charge current and a charge voltage are changed if determined that the charge current exists;
  determining whether to maintain the charge current by determining whether the charge current is changed from a first current level to a second current level less than the first current level and a present voltage level of the battery is less than a former voltage level at a point in time at which the charge current exists and the charge current and charge voltage are both changed if determined that the charge current and the charge voltage are changed; and
  maintaining the charge current at the second current level for a predetermined maintenance time if determined to maintain the charge current.

2. The method as claimed in claim 1, wherein the determining of whether the charge current exists comprises determining that the charge current exists if the charge current is detected for a predetermined detection time.

3. The method as claimed in claim 2, wherein the predetermined detection time ranges from about 0.5 seconds to about 2 seconds.

4. The method as claimed in claim 1, wherein the determining of whether the charge current exists comprises recognizing that the battery is in a self discharge mode if the charge current does not exist.

5. The method as claimed in claim 1, wherein the predetermined maintenance time ranges from about 0.5 seconds to about 2 seconds.

6. The method as claimed in claim 1, wherein the determining of whether the charge current and the charge voltage are changed comprises determining that the charge current and the charge voltage are changed if a charge control signal changing both the charge current and the charge voltage is received from an external system controlling the charging of the battery.

7. The method as claimed in claim 1, wherein the maintaining of the charge current at the second current level for the predetermined maintenance time comprises generating a changed charge current maintenance signal maintaining the charge current at the second current level for the predetermined maintenance time and transmitting the changed charge current maintenance signal to an external system controlling the charging of the battery.

8. The method as claimed in claim 1, wherein the battery is charged according to a charging operation type wherein the charge current is sequentially reduced if the charge voltage is increased by an external system.

9. The method as claimed in claim 8, wherein the charge current is reduced in tiers.

10. A battery pack comprising:
  a battery comprising at least one battery cell, the battery being connected to an external terminal through a high current path;
  a protective circuit connected in parallel to the battery and the external terminal, the protective circuit detecting a voltage of the battery; and
  a controller connected in series between the protective circuit and the external terminal in order to receive a voltage level of the battery from the protective circuit, the controller communicating with an external system through the external terminal, and wherein if the controller determines that a charge current exists in the battery, and if the controller determines that the charge current and a charge voltage are changed, and if the controller determines that the charge current of the battery is changed from a first current level to a second current level less than the first current level, and if the controller determines that a present voltage level is less than the former voltage level at point in time at which the charge current exists and the charge current and charge voltage are both changed, then the controller generates a changed charge current maintenance signal maintaining the charge current at the second current level for a predetermined maintenance time.

11. The battery pack as claimed in claim 10, further comprising:

a sensor resistor disposed on the high current path, the sensor resistor being connected to the controller, wherein the controller determines that the charge current exists in the battery if the charge current of the battery is detected in the sensor resistor for a predetermined detection time.

12. The battery pack as claimed in claim 11, wherein the predetermined detection time ranges from about 0.5 seconds to about 2 seconds.

13. The battery pack as claimed in claim 10, wherein, if the charge current does not exist in the battery, the controller recognizes that that the battery is in a self discharge mode, generates a self discharge mode signal, and transmits the self discharge mode signal to the external system.

14. The battery pack as claimed in claim 10, wherein the predetermined maintenance time ranges from about 0.5 seconds to about 2 seconds.

15. The battery pack as claimed in claim 10, wherein the controller determines that the charge current and the charge voltage are changed if a charge control signal changing the charge current and the charge voltage is received from the external system controlling the charging of the battery.

16. The battery pack as claimed in claim 10, wherein the controller transmits the changed charge current maintenance signal to the external system controlling the charging of the battery.

17. The battery pack as claimed in claim 10, further comprising an SMBUS between the controller and the external terminal, the SMBUS allowing the controller and the external system to communicate with each other.

18. The battery pack as claimed in claim 10, wherein the battery is charged according to a charging operation type wherein the charge current is reduced sequentially if the charge voltage is increased by the external system.

19. The battery pack as claimed in claim 18, wherein the charge current is reduced in tiers.

* * * * *

UNITED STATES PATENT AND TRADEMARK OFFICE
CERTIFICATE OF CORRECTION

Page 1 of 1

PATENT NO.       : 8,686,690 B2
APPLICATION NO.  : 12/868655
DATED            : April 1, 2014
INVENTOR(S)      : Seongpyo Hong It is certified that error appears in the above-identified patent and that said Letters Patent is hereby corrected as shown below:

In the Claims

Column 11, Claim 10, line 10     After "at" (First Occurrence)

Insert -- a --

Column 12, Claim 13, line 1     After "recognizes"

Delete "that"

Signed and Sealed this
Nineteenth Day of January, 2016

Michelle K. Lee
*Director of the United States Patent and Trademark Office*